(12) United States Patent
Ming

(10) Patent No.: US 10,423,998 B2
(45) Date of Patent: Sep. 24, 2019

(54) PRODUCT INFORMATION SYSTEM

(71) Applicant: PAYPAL, INC, San Jose, CA (US)

(72) Inventor: Erin Christine Ming, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1023 days.

(21) Appl. No.: 14/169,312

(22) Filed: Jan. 31, 2014

(65) Prior Publication Data

US 2015/0221010 A1     Aug. 6, 2015

(51) Int. Cl.
   *G06Q 30/00* (2012.01)
   *G06Q 30/06* (2012.01)
   *G06Q 10/08* (2012.01)

(52) U.S. Cl.
   CPC ....... *G06Q 30/0623* (2013.01); *G06Q 10/087* (2013.01); *G06Q 30/0639* (2013.01)

(58) Field of Classification Search
   CPC ........... G06Q 30/0623; G06Q 30/0639; G06Q 10/087
   USPC ......................................... 705/26.1–27.2, 14
   See application file for complete search history.

(56) References Cited

U.S. PATENT DOCUMENTS

| | | | |
|---|---|---|---|
| 8,401,911 B1 | 3/2013 | Chu et al. | |
| 2009/0012704 A1 | 1/2009 | Franco et al. | |
| 2010/0156597 A1* | 6/2010 | Stern ................... | G06K 7/0008 340/5.92 |
| 2012/0259732 A1* | 10/2012 | Sasankan .............. | G01S 5/0205 705/26.9 |
| 2013/0030915 A1 | 1/2013 | Statler et al. | |
| 2013/0080279 A1* | 3/2013 | Daily ...................... | A47F 9/047 705/23 |
| 2013/0179311 A1 | 7/2013 | Lee et al. | |
| 2013/0282533 A1* | 10/2013 | Foran-Owens .... | G06Q 30/0641 705/27.1 |
| 2013/0313317 A1* | 11/2013 | Waters ................... | G06Q 10/08 235/385 |
| 2014/0188601 A1* | 7/2014 | Buset ................. | G06Q 30/0633 705/14.49 |

OTHER PUBLICATIONS

Loebbecke, Claudia, "RFID Technology and Applications in the Retail Supply Chain: The Early Metro Group Pilot" (2005). BLED 2005 Proceedings. 42. (Year: 2005).*

* cited by examiner

*Primary Examiner* — Jason B Dunham
*Assistant Examiner* — Anand R Loharikar
(74) *Attorney, Agent, or Firm* — Haynes and Boone, LLP

(57) ABSTRACT

Systems and methods for providing product information at a merchant physical location include a system provider device that updates information in a database about each of a plurality of products in the merchant physical location in real time. A product identifier, which is collected from a first customer device that is associated with a first customer, is received by the system provider device over a network from at least one of a plurality of beacon devices that are located at the merchant physical location. The product identifier is used to retrieve pricing information and inventory information about a first product of the plurality of products in the merchant physical location. The pricing information and the inventory information for the first product are then provided through the network for display on the first customer device.

20 Claims, 15 Drawing Sheets

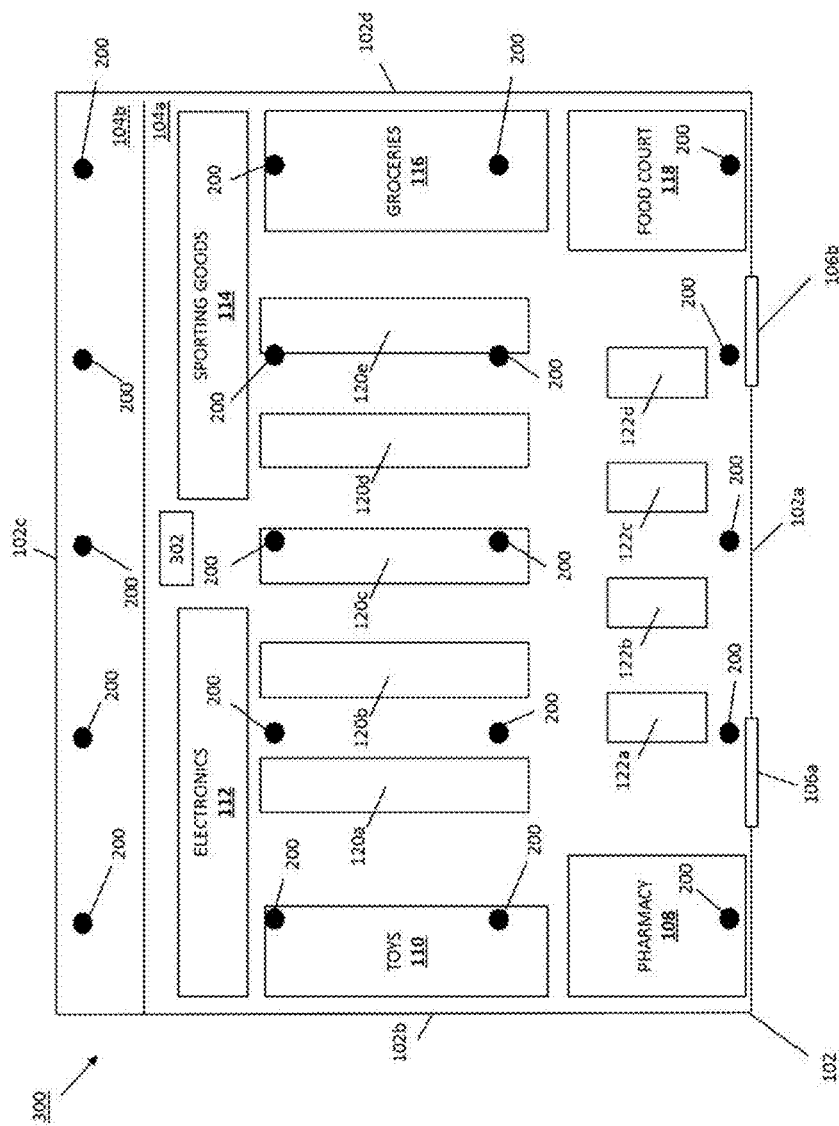

PRODUCT INFORMATION SYSTEM

BACKGROUND

Field of the Invention

The present disclosure generally relates to merchant physical locations, and more particularly to a product information system for customers at a merchant physical location.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with merchant physical locations and their customers. Some merchants may attempt to provide their customers with product information at their merchant physical location by, for example, providing dedicated price checking devices to customers that allow those customer to scan a barcode on the product to obtain the price of the product, or by providing their employees with the dedicated price checking devices for use in helping customers find product prices. However, such price checking devices (or employees with those devices) may be difficult for customers to find and are often out of service. Furthermore, the prices retrieved for products using dedicated price checking devices at a merchant physical location are typically a price that is set for the product at a plurality of merchant physical locations that are part of a "chain" store, and do not take into account any discounts, deals, or other offers being made at a particular merchant physical location.

Thus, there is a need for an improved product information system.

BRIEF DESCRIPTION OF THE FIGURES

FIG. 3a is a schematic view illustrating an embodiment of a product information system that includes a plurality of the beacon devices of FIG. 2 in the merchant physical location of FIG. 1;

Figure 1:
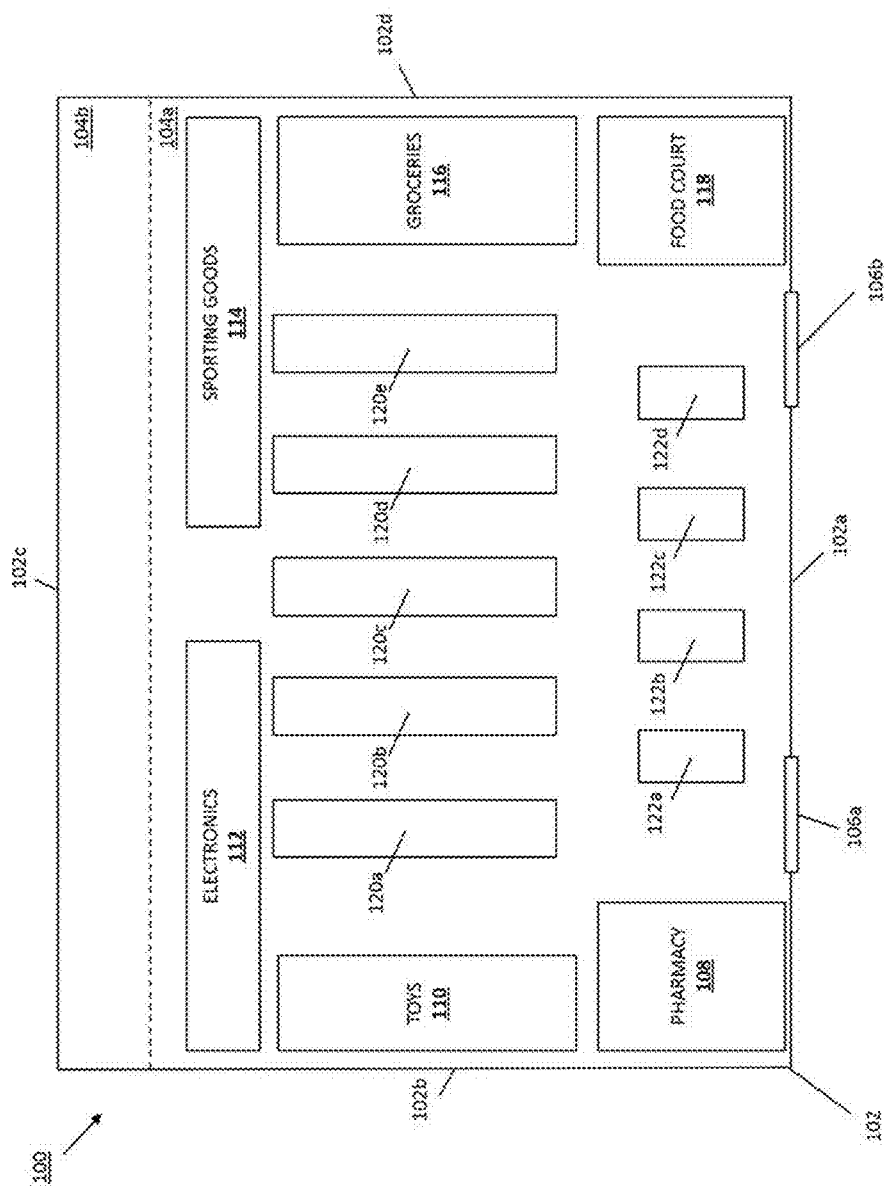
FIG. 1 is a schematic view illustrating an embodiment of a merchant physical location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing customers with product information at a merchant physical location. A plurality of beacon devices is provided at the merchant physical location and is configured to communicate with customer devices around and throughout the merchant physical location during customer shopping sessions. A system provider device receiving a product identifier from a customer device may use that product identifier, information about the merchant physical location, and information about the products in the merchant physical location that is updated in real time to retrieve real time pricing information, inventory information, and/or location information for a product associated with the product identifier. The system provider device may then provide the pricing information, inventory information, and/or location information for display on the customer device that sent the product identifier. For example, a customer may enter the merchant physical location with a customer device such as a mobile phone, and use that customer device to scan a barcode provided on any product or product shelf to retrieve pricing information for that product, inventory information for that product, and/or locations around the merchant physical location where that product can be found. In another example, a customer may enter the merchant location looking for a product they have viewed on a website, and may provide that website to receive pricing information for that product at the merchant physical location, inventory information for that product at the merchant physical location, and/or locations around the merchant physical location where that product can be found. In addition, if the inventory information associated with a product indicates that the product is not available at the merchant physical location, other merchant physical locations where that product is available may be provided to the customer.

Referring now to FIG. 1, an embodiment of a merchant physical location 100 is illustrated. The merchant physical location 100 includes a merchant building 102 having a plurality of exterior walls 102a, 102b, 102c, and 102d that define a merchant physical location interior 104a and merchant physical location inventory section 104b that, in the embodiments illustrated and discussed below, is utilized as a department/grocery store. However, one of skill in the art in possession of the present disclosure will recognize that the product information system described herein may be utilized with virtually any merchant physical location such as, for example, an electronics store, a clothing store, a book store, a hardware store, and/or a variety of other merchant physical locations known in the art. The exterior wall 102a includes pair of exterior doors 106a and 106b (e.g., "front" doors in the illustrated embodiment).

In an embodiment, the merchant physical location interior 104a of the merchant physical location 100 includes a plurality of product sections. For example, as discussed above, in the embodiments discussed below the merchant physical location 100 is a department/grocery store and the merchant physical location interior 104a includes a Pharmacy section 108, a Toys section 110, an Electronics section 112, a Sporting Goods section 114, a Groceries section 116, and a Food Court section 118. While an example of a department/grocery store is provided, one of skill in the art will recognize that any variety of different product sections in any merchant physical location will fall within the scope of the present disclosure. The merchant physical location interior 104a also includes a plurality of product shelves 120a, 120b, 120c, 120d, and 120e, each of which hold clothing in the embodiments discussed below. The merchant physical location interior 104a also includes a plurality of check-out stands 122a, 122b, 122c, and 122d that may each include systems (e.g., Point Of Sale (POS) devices) for allowing customers to purchase products provided at the merchant physical location 100. The merchant physical location inventory section 104b may store inventory for any of the products provided at the merchant physical location interior 100.

In an embodiment, the merchant physical location 100 is associated with an inventory system that tracks the inventory for each of the products provided at the merchant physical location. That inventory system may be located at the merchant physical location 100 and coupled to merchant devices, POS devices, and/or other devices known in the art that may be used to update the inventory information. However, in other embodiments, the inventory system may be provided at a location that is remote from the merchant physical location 100, and may be coupled to the merchant devices, POS devices, and/or other devices for updating inventory information through a network (e.g., the Internet.) As discussed below, the inventory information stored in the inventory system for the merchant physical location 100 may be updated in real time using the merchant devices, the POS devices, and/or the other devices for updating inventory information at the merchant physical location 100.

Figure 2:
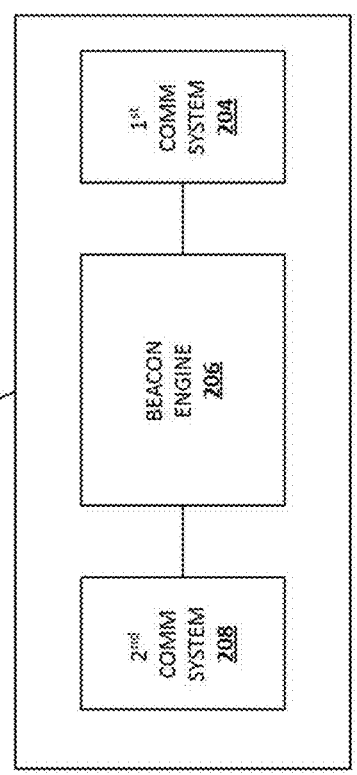
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instruction on a memory system (not illustrated) in the beacon device 200 that, when executed by a processing system (not illustrated) in the beacon device 200, cause the processing system to perform the functions of the beacon device 200 discussed below. The beacon engine 206 is coupled to a second communication system 208 such as, for example, a Bluetooth® Low Energy (BLE) communication system. The beacon engine 206 may be configured to receive any of a variety of sensor signals through the second communication system 208 and transmit those sensor signals using the first communication system 205. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to any part of a merchant physical location, discussed below.

Figure 3B:
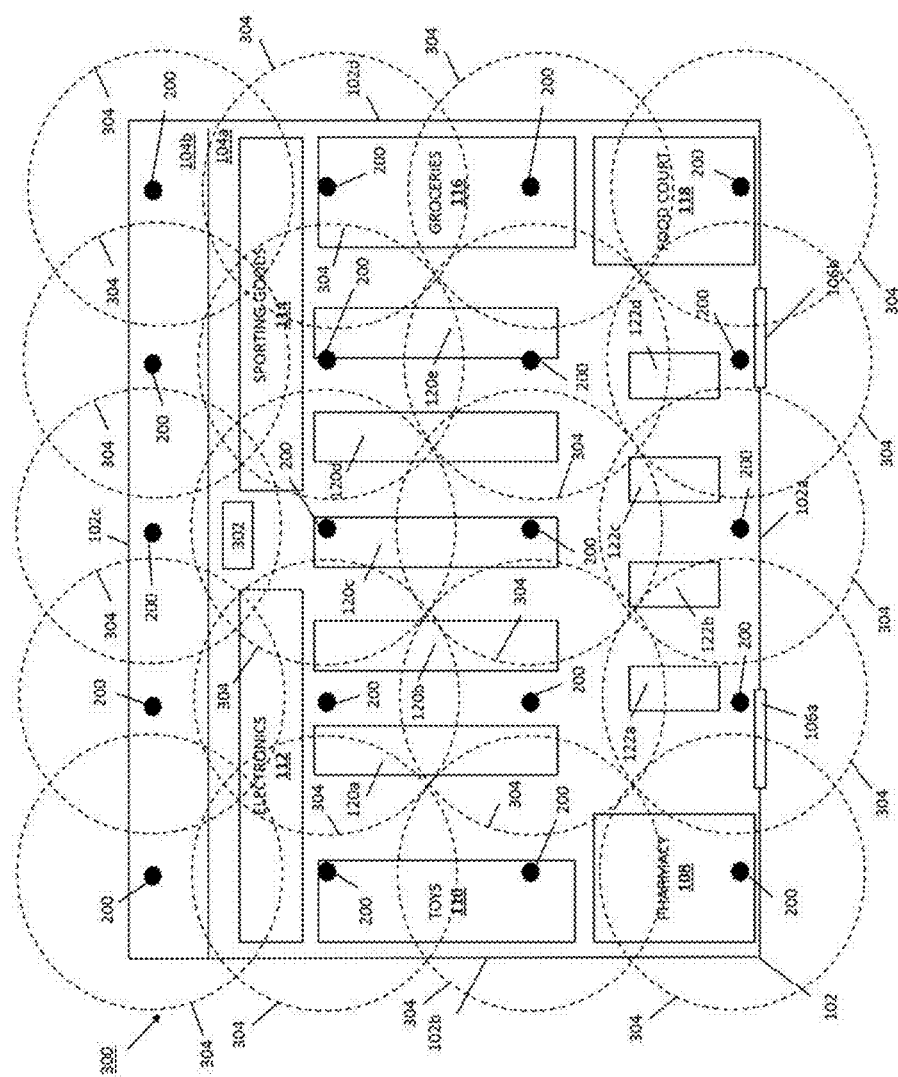
FIG. 3b is a schematic view illustrating an embodiment of the product information system of FIG. 3a with the beacon devices providing communication areas.

Referring now to FIGS. 3a and 3b, an embodiment of a product information system 300 is illustrated. As illustrated in FIG. 3a, the product information system 300 is provided by positioning a plurality of the beacon devices 200, discussed above with reference to FIG. 2, in and around the merchant physical location 100, discussed above with reference to FIG. 1. As discussed above, the beacon devices 200 may be sized such that they may be inconspicuously positioned virtually anywhere in or around the merchant physical location 100. For example, the beacon devices 200 may be positioned on the ceiling of the merchant physical location interior 104a or merchant physical location inventory section 104b, on the product shelves 120a-e, on the check-out stands 122a-d, and/or in any other part of the merchant physical location 100. Each of the beacon devices 200 in the product information system 300 may be configured to wirelessly communicate, via its first communications system 204, with a merchant network communication device 302 such as, for example, a Wifi wireless router connected to a network such as the Internet.

Referring now to FIG. 3b, in operation, each of the beacon devices 200 is configured to create a communication area 304 with its second communications system 204. For example, the second communications system 204 in each beacon device 200 may be BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the merchant physical location 100 such that the communications areas 304 abut, overlap, or otherwise provide coverage for any area of interest within and around the merchant physical location 100. As such, one of skill in the art in possession of the present disclosure will appreciate that different configurations of the beacon devices 200 within and around the merchant physical location 100 may be selected to cover any area within and around the merchant physical location 100 with a communications area 304.

As discussed in further detail below, each of the beacon devices 200 are configured to communicate with customer devices within their respective communications area 304 (e.g., using the second communication system 208) to collect information, and then send that information to the merchant network communication device 302 (e.g., using the first communication system 204) such that the data may be provided to a merchant device, a system provider device, and/or any other device operating to provide customer shopping help system discussed below. In an embodiment, each of the beacon devices 200 may communicate with the POS/inventory system at the merchant physical location 100 to retrieve real time product information, discussed in further detail below. For example, the beacon devices 200 may communicate with a Milo® inventory system provided by EBay, Inc. of San Jose, Calif.

Furthermore, one of skill in the art in possession of the present disclosure will recognize that the first communications system 204 and the second communications system 208 in the beacon devices 200 may be selected such that the product information system 300 does not require an Internet data connection or cellular data connection for a customer device to retrieve product information. In other words, the product information system 300 may be provided as a local communication system within the merchant physical location 100 in which customer devices communicate through the beacon devices 200 with a system provider device that accesses local databases (i.e., stored at the merchant physical location 100) to retrieve and provide product information to the customer devices. As such, customer devices may be enabled to retrieve real-time product information directly from a POS/inventory system at the merchant physical location 100 through the beacon devices 200, rather than through a website that may only be updated occasionally. However, in other embodiments, the system provide device in the product information system 300 may utilize an Internet data connection, cellular data connection, or other network to access remote databases for providing product information (or other information discussed below) to the customer devices.

In the embodiments illustrated and discussed below, the beacon devices 200 and their communications areas 304 are not illustrated for clarity, but it should be understood that the communications and retrieval of information from beacon communication devices, and the provision of that information to a system provider device, is accomplished using beacon devices providing communications areas such as the beacon devices 200 and communications areas 304 illustrated in FIGS. 3a and 3b. While a specific example of a product information system 300 is provided, one of skill in the art in possession of the present disclosure will recognize that a wide variety of different merchant physical locations may incorporate the beacon devices 200 in a variety of manners while remaining within its scope.

In the embodiments discussed below, the product information systems and methods involve a system provider using a system provider device to receive product identifiers collected by the beacon devices 200 from customer devices at the merchant physical location 100, and use those product identifiers to retrieve product information from local databases (e.g., the inventory system at the merchant physical location) and/or remote databases (e.g., through a network). In some embodiments, the system provider device may be a merchant device that is local to the merchant physical location 100 and that communicates with the beacon devices 200 using the merchant network communication device 302. In other embodiments, the system provider may be, for example, a payment service provider that provides the product information system 300 for the merchant at the merchant physical location 100, and receives product identifiers at a payment service provider device that are sent from the customer devices, through the beacon devices 200, and possibly through a merchant device and a network (e.g., the Internet). In such embodiments, the payment service provider device may associate the merchant physical location 100 (or its merchant), the beacon devices 200, merchant devices, and/or other components of the system with a merchant account in a database located in a non-transitory memory. As such, information sent and received through the beacon devices and merchant devices may be associated with the merchant account in the database, and any use of that information may be stored in associated with that merchant account. As such, the payment service provider may provide product information systems for a plurality of different merchants and merchant physical locations.

In an embodiment, the operation of the product information system 300 may include providing a map of the merchant physical location 100 and the relative locations of the products provided therein. For example, the dimensions, relative locations, and/or other characteristics of the Pharmacy section 108, Toys section 110, Electronics section 112, Sporting Goods section 114, Groceries section 116, Food Court section 118, product shelves 120a-d, check-out stands 122ad, product advertisements, marketing materials, and/or any other feature in the merchant physical location interior 104a and merchant physical location inventory section 104b may be provided to the system provider device. As discussed below, the provision of such information to the system provider device allows the system provider device to create and utilize a detailed map, layout, or other reproduction of the merchant physical location interior 104a and/or merchant physical location inventory section 104b. Furthermore, the positions/locations of products in the merchant physical location interior 104a and the merchant physical location inventory section 104b may also be provided to the system provider device. In one example, the positions/locations of products may be provided by the merchant or a system provider by selecting areas on a map of the merchant physical location 100. In another example, beacon communication devices may be attached to each product, and those beacon communication devices may be configured to report a product identification and a location for each product to the beacon devices 200 (e.g., using a communication systems such as the BLE communications system discussed above.) As discussed below, the provision of such information to the system provider device allows the system provider device to determine the current location of any product in the merchant physical location interior 104a and/or merchant physical location inventory section 104b. While a few examples of the provision of merchant physical location layout information and product location information to the system provider device have been described, one of skill in the art in possession of the present disclosure will recognize that a wide variety of merchant physical location information, product information, and information provisioning techniques will allow for the functionality of the system provider device discussed below, and thus will fall within the scope of the present disclosure.

Furthermore, FIGS. 1, 3a, and 3b illustrate a merchant physical location 100 that is a single building, with the beacon devices 200 positioned to provide communications areas 304 that cover the interior of that single building, and outside sections in the front of that single building. However, beacon devices 200 may be positioned virtually anywhere to retrieve information associated with a merchant physical location. For example, the merchant physical location may be located adjacent to or associated with a parking lot, and beacon devices may be positioned around that parking lot, at the entrances or exits of that parking lot, and/or anywhere else relative to that parking lot in order to collect and send information from customer devices to the system provider device. In another example, the merchant physical location may be located in a mall, and beacon devices may be positioned around that mall, at the entrances or exits of that mall, and/or anywhere else relative to that mall in order to collect and send information from customer devices to the system provider device. In some examples, the first communication system may be connected to Wifi networks available outside the merchant physical location in order to communicate collected information to a system provider device. In other examples, the first communication system may be a cellular communications system that allows the beacon devices to be positioned anywhere in range of a cellular communications tower, allowing beacon devices to be positioned in virtually any physical location when providing the product information system. As such, requests for product information for products in the merchant physical location 100 may be performed outside the merchant physical location 100.

Figure 4:
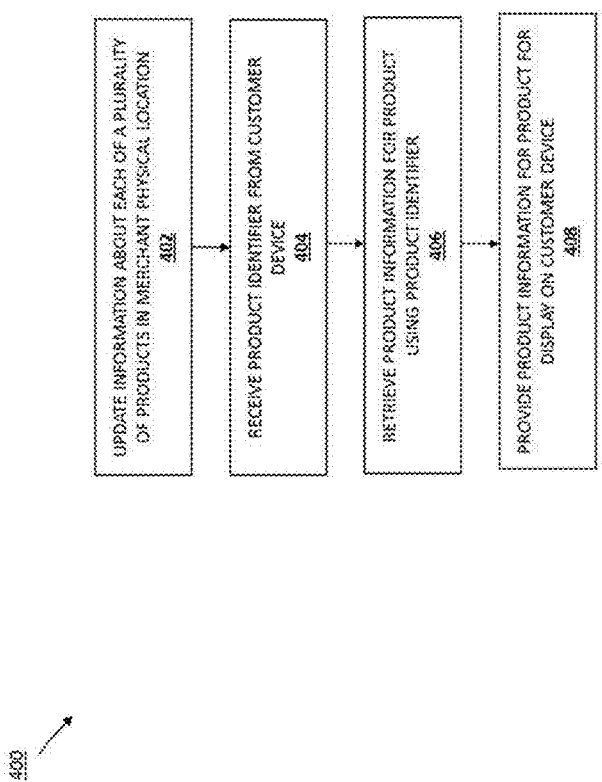
FIG. 4 is a flow chart illustrating an embodiment of a method for providing product information to a customer.

Referring first to FIG. 4, an embodiment of a method 400 for providing product information to customers at a merchant physical location is illustrated. The method 400 begins at block 402 where information about each of a plurality of products in a merchant physical location is updated. As discussed above, the merchant physical location 100 includes a plurality of products that may be located in the merchant physical location interior 104a and/or the merchant physical location inventory section 104b. At block 402, a wide variety of information about those products may be updated in real time. In an embodiment, pricing information about any product in the merchant physical location 100 may be updated at block 402. For example, a database associate with the merchant physical location 100 may store the pricing information for each of the products in the merchant physical location, and at block 402, a pricing change (e.g., provided to the database by the merchant through a merchant device) may be received for at least one of those products and, in response, the pricing information for the at least one product in the database may be adjusted based on that pricing change. As such, the pricing information for any product may be changed by the merchant, and the pricing information for that product with be updated in real time in the database. The updating of pricing information for products allows a merchant to change prices of products to, for example, provide sales, discounts, or other offers for the product at a price that is less than the usual price of the product, or increase the price of the product from its usual price in response to, for example, scarcity of the product. While a few examples of pricing changes have been provided, any pricing changes (or reason for pricing changes) are envisioned as falling within the scope of the present disclosure.

In another embodiment, inventory information about any product in the merchant physical location 100 may be updated at block 402. For example, a database associate with the merchant physical location 100 may store the inventory information for each of the products in the merchant physical location 100, and at block 402, a sale of at least one of those products may be detected and, in response, the inventory information for the at least one product in the database may be adjusted based on that detected sale. As such, the inventory information for any product may be adjusted automatically in response to products associated with that inventory being sold, and the inventory information for that product will be updated in real time in the database. In another embodiment, at block 402, products may be stolen, broken, returned to the manufacturer, and/or otherwise not available at the merchant physical location and, in response, the inventory information for the at least one product in the database may be adjusted based on those occurrences. For example, inventory information may be provided through a merchant device by the merchant into the database to indicate that the product was stolen, broken, or returned, or is otherwise not available at the merchant physical location 100. In another example, beacon communication devices on the products may cease communicating through the beacon devices 200 with the system provider device (e.g., because they have been removed from the merchant physical location 100) and, in response, the inventory information for those product in the database may be adjusted. While a few examples of inventory changes have been provided, any inventory changes (or reason for inventory changes) are envisioned as falling within the scope of the present disclosure.

In another embodiment, location information about any product in the merchant physical location 100 may be updated at block 402. For example, a database associate with the merchant physical location 100 may store the location information for each of the products in the merchant physical location 100, and at block 402, a change in the location of at least one of those products may be detected and/or reported and, in response, the location information for the at least one product in the database may be adjusted based on that location change. As such, the location information for any product may be adjusted through a merchant device by a merchant (e.g., in response to moving those products to a different location within the merchant physical location 100) or automatically reported (e.g., through communication with the beacon devices 200 using a beacon communication device coupled to the product), and the location information for that product will be updated in real time in the database. While a few examples of location changes have been provided, any location changes (or reason for location changes) are envisioned as falling within the scope of the present disclosure.

Thus, pricing information, inventory information, and location information for each of the plurality of products in the merchant physical location 100 may be stored by the system provider device in the database and updated in real time (e.g., as that information is received from a merchant through a merchant device, reported through the beacon devices 200 by beacon communication devices that are coupled to the products, reported by POS devices in response to sales, etc.) While examples of product information that includes pricing information, inventory information, and location information have been provided, one of skill in the art in possession of the present disclosure will recognize any of a wide variety of other product information known in the art about products in a merchant physical location may be stored and updated in real time in the database, and will fall within the scope of the present disclosure.

Figure 5:
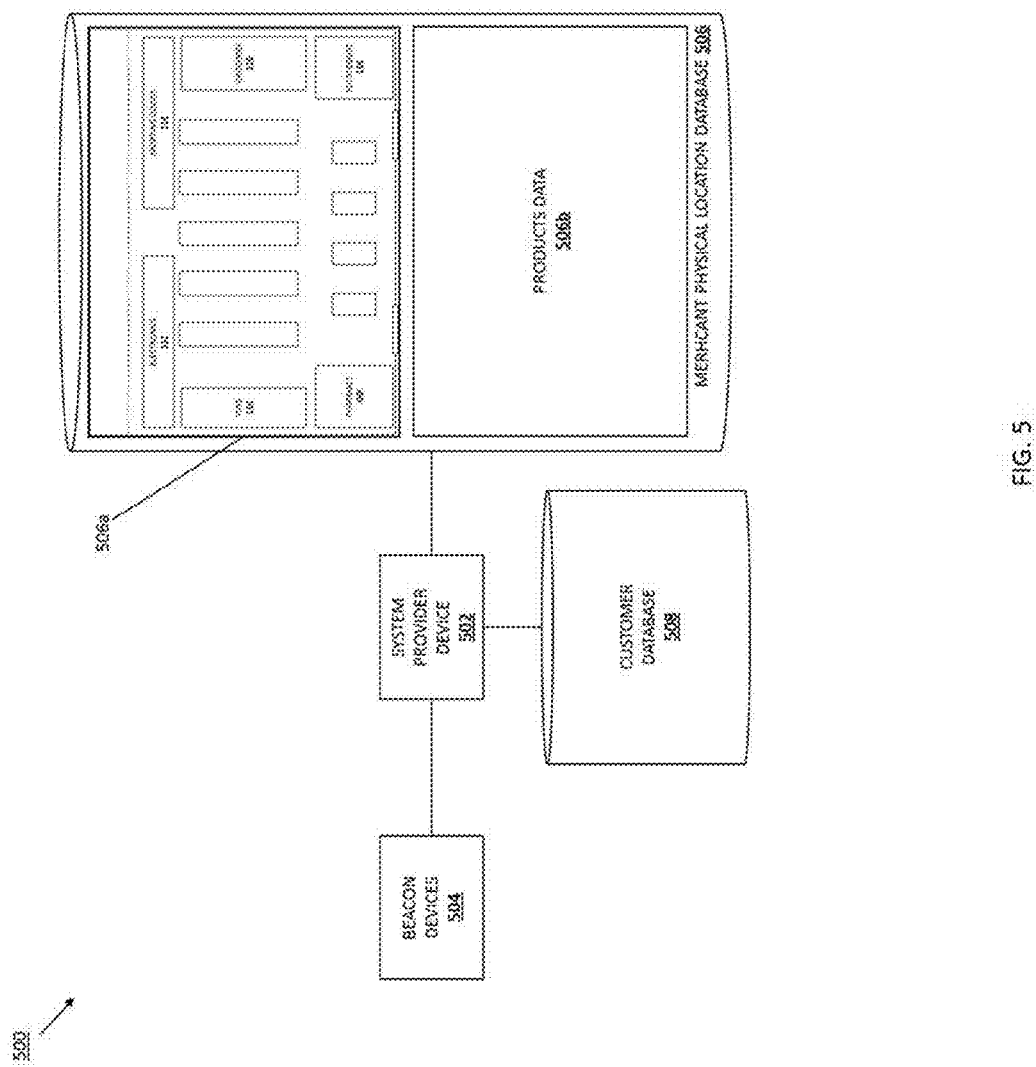
FIG. 5 is a schematic view illustrating an embodiment of a system provider device connected to beacon devices in the merchant physical location of FIG. 3a and to customer and merchant physical location databases to provide product information.

Referring now to FIG. 5, an embodiment of a portion of a product information system 500 is illustrated that allows product information to be updated during block 402. The product information system 500 includes a system provider device 502 communicatively coupled to beacon devices 504 (which may be the beacon devices 200 discussed above), a merchant physical location database 506, and a customer database 508. While illustrated as single databases, the merchant physical location database 506 and customer database 508 may include multiple databases that may be located at the merchant physical location 100 and/or coupled to system provider device 502 by a network (e.g., the Internet).

In an embodiment, the merchant physical location database 506 may store the merchant physical location information 506a discussed above that describes the layout of the merchant physical location 100 including the Pharmacy section 108, Toys section 110, Electronics section 112, Sporting Goods section 114, Groceries section 116, Food Court section 118, product shelves 120a-e, check-out stands 122a-d, product advertisements, marketing materials, and/or any other feature in the merchant physical location interior 104a and merchant physical location inventory section 104b. The merchant physical location database 506 also includes the products data 506b about each of the products in the merchant physical location 100 that may be updated in real time as discussed above with reference to block 402. Furthermore, the customer database 508 may store customer information such as customer account information, customer purchase histories, customer preferences, and/or a variety of other customer information known in the art.

Figure 6:
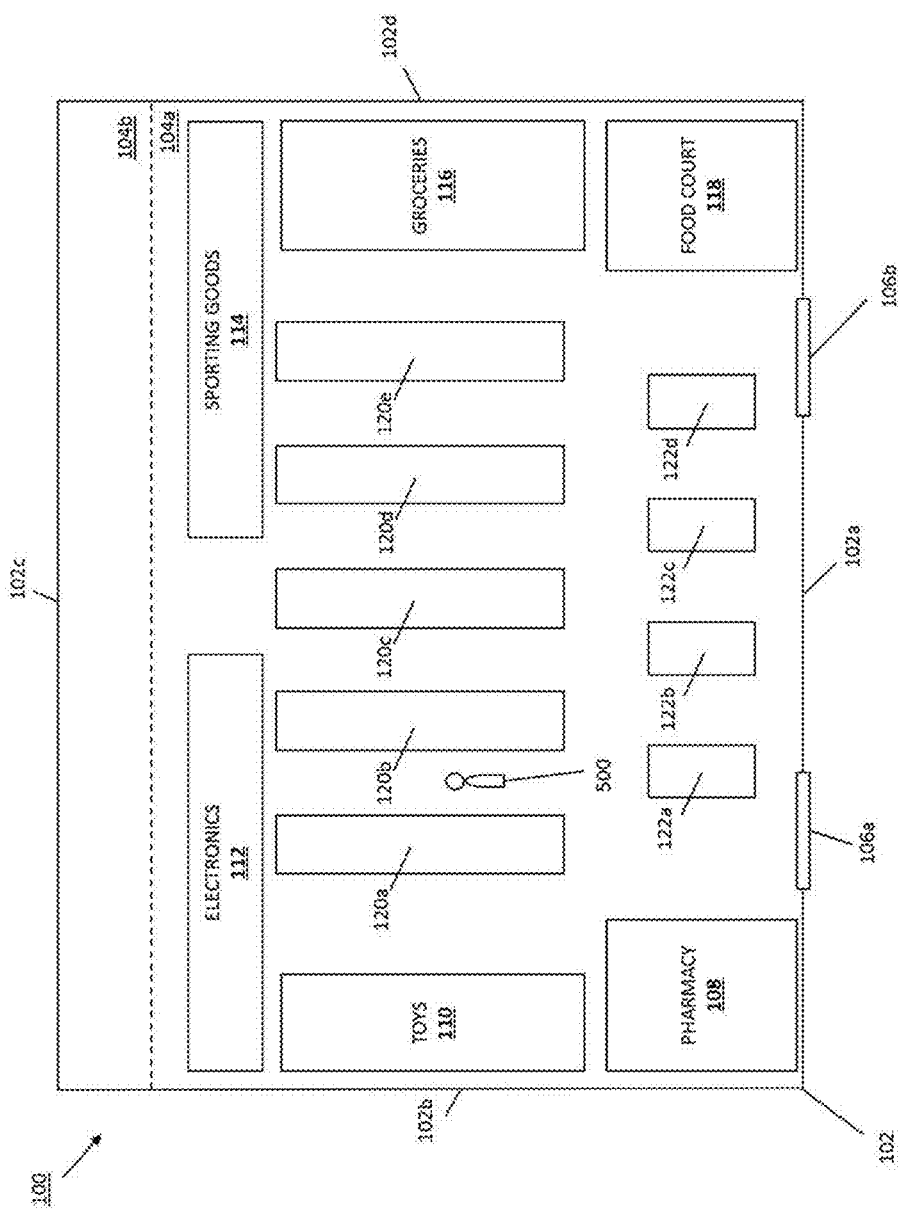
FIG. 6 is a schematic view illustrating an embodiment of a customer located in the merchant physical location of FIG. 1.
Figure 7A:
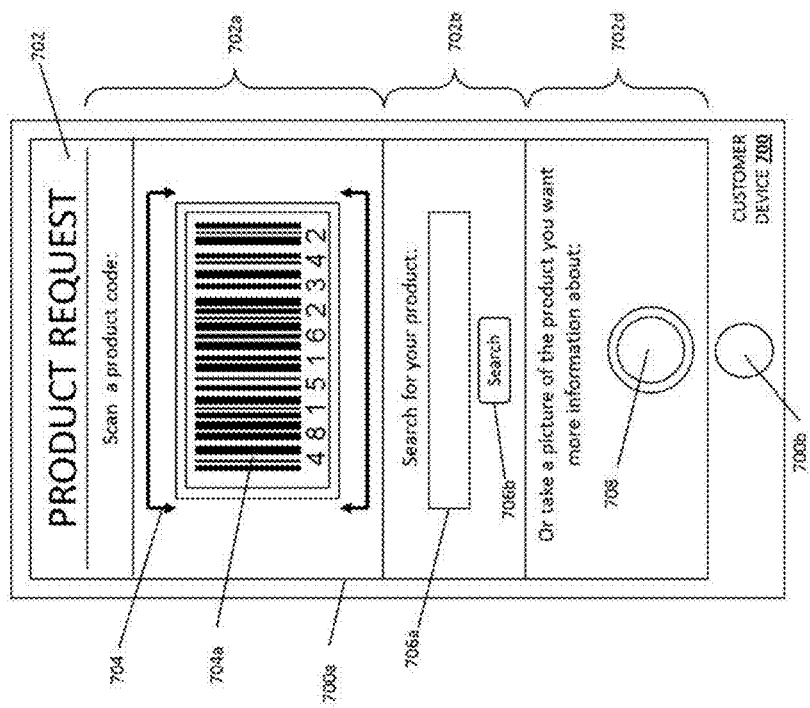
FIG. 7a is a front view illustrating an embodiment of a customer device displaying a product request screen.

Referring now to FIGS. 4, 6, and 7a, the method 400 then proceeds to block 404 where a product identifier is received from a customer device. Referring first to FIG. 6, a customer 500 is illustrated located in the merchant physical location 100 between the product shelves 120a and 120b. In the example provided below, the product shelves 120a-e hold clothing products, and the customer 500 is requesting and receiving product information about one of the clothing products. However, one of skill in the art in possession of the present disclosure will recognize that the customer 500 may request and receive product information like that discussed below about virtually any product in a merchant physical location while remaining within the scope of the present disclosure. In the illustrated embodiment, the customer 500 has entered the merchant physical location 100 (e.g., through the doors 106a or 106b) and may be looking for a product, may have found a product and be requesting more information about that product, and/or may have been performing a variety of other product actions known in the art prior to sending the product identifier at block 402.

In an embodiment of block 404, the system provider device 502 may receive the product identifier from at least one the beacon devices 504 in response to the at least one beacon device collecting that product identifier from a customer device of the customer 500. Referring now to FIG. 7a, a customer device 700 is illustrated that includes a display 700a and an input button 700b. In the embodiments discussed below, the customer device 700 is illustrated and described as a mobile phone. However, a variety of other customer devices are envisioned as falling within the scope of the present disclosure. In the illustrated embodiment, the customer device 700 is displaying a product request screen 702 that provides the customer 500 a variety of options for providing the product identifier at block 404. For example, the customer device 700 may include a product information application, which may be launched by the customer or may automatically launch upon entering the merchant physical location 100 (e.g., in response to communication with the beacon devices 504), that provides for the functionality of the customer device 700 discussed below. In the illustrated embodiment, the product request screen includes a scanning section 702a, a search section 702b, and a photo section 702c for providing the product identifier at block 404. While the product information application is illustrated as providing the product request screen 702 immediately, in some embodiments, the customer 500 may be required to provide authentication credentials in order to access the product request screen 702.

In some embodiments of block 404, the customer 500 may find a product in the merchant physical location 100 (e.g., on the product shelf 120a) and provide the product identifier by scanning a barcode 704a that is located on the product. For example, the customer 500 may position the customer device such that a camera on the customer device 700 captures the barcode 704a within a scanning input box 704 in the scanning section 702a of the product request screen 702. The positioning of the barcode 704a in the scanning input box 704 may allow a scanning engine in the customer device 700 to decode the barcode 704a and determine a product identifier that may then be sent through the beacon devices 504 to the system provider device 502. Similarly, in other embodiments of block 404, the customer 500 may find a product shelf in the merchant physical location 100 (e.g., the product shelf 120a) that includes the barcode 704a but that does not include the product associated with that barcode 704a, and may provide the product identifier by scanning the barcode 704a substantially as discussed above. While the analysis of the scanned barcode 704a has been discussed as being performed in the customer device 700, in some embodiments, the scanned barcode 704a may be sent to the system provider device 502 and then analyzed by a scanning engine in the system provider device 502 to determine the product identifier while remaining within the scope of the present disclosure.

In some embodiments of block 404, the customer 500 may enter the merchant physical location 100 knowing a product they are looking for and provide the product identifier by providing a search term to a search input box 706a in the search section 706b of the product request screen 702. The provision of the search term in the search input box 706a may allow the user to search through a product inventory for the merchant physical location 100 (e.g., via the inventory system in the merchant physical location 100), search through web pages for a webpage that includes the product that they are searching for, and/or perform a variety of other search actions known in the art. The customer may then select the product and/or provide the web page describing the product as the product identifier through the beacon devices 504 to the system provider device 502. In other embodiments, the customer may have saved product identifiers as book marked web pages, search terms, wish lists, and/or other information, and at block 404 the product request screen 702 may allow the customer to provide any of those product identifiers (e.g., by selecting a previously used search term, providing a bookmarked webpage, providing a product in a wish list) through the beacon devices 504 to the system provider device 502.

In some embodiments of block 404, the customer 500 may find a product in the merchant physical location 100 (e.g., on the product shelf 120a) and provide the product identifier by capturing an image of the product. For example, the customer 500 may position the customer device 700 such that a camera on the customer device 700 captures the product (e.g., within an image input box similar to the scanning input box 704 in the scanning section 702a of the illustrated embodiment) and selecting a capture button 708 in the photo section 702d of the product request screen 702. The capturing of an image of the product allows an image recognition engine in the customer device 700 to analyze the captured image and determine a product identifier that may then be sent through the beacon devices 504 to the system provider device 502. While the analysis of the captured image has been discussed as being performed in the customer device 700, in some embodiments, the captured image may be sent to the system provider device 502 and then analyzed by an image recognition engine in the system provider device 502 to determine the product identifier while remaining within the scope of the present disclosure.

While a few example of the provision of the product identifier from the customer device 700, through the beacon devices 504, and to the system provider device 502, have been provided, one of skill in the art in possession of the present disclosure will recognize that a wide variety of systems and methods for providing the product identifier at block 404 will fall within the scope of the present disclosure. For example, the customer device 700 may include a Near Field Communication (NFC) system or Radio Frequency Identification (RFID) system that can retrieve product identifiers from NFC or RFID devices on products and provide those product identifiers through the beacon devices 504 to the system provider device 502. In another example, the customer may speak a description of the product (e.g., the product name) into the customer device 700 and a speech recognition engine in the customer device 700 or the system provider device 502 may be configured to analyze the audio from the spoken description of the product to determine the product identifier. Thus, any systems and methods for determining and providing product identifiers are envisioned as falling within the scope of the present disclosure.

The method 400 then proceeds to block 406 where product information is retrieved for a product using the product identifier. In an embodiment, the system provider device 502 uses the product identifier that was received through at least one of the beacon devices 504 at block 404 from the customer device 700 (or determined by the system provider device from information received through at least one of the beacon devices 504 at block 404 from the customer device 700), and uses the product identifier to determine a product and retrieve product information associated with that product from the merchant physical location database 506. For example, the product identifier received at block 404 may be associated with one of the products in the product data 506b in the merchant physical location database 506, and each of the products in the product data 506b may be associated with respective product information about those products that may be updated in real time according to block 402. As discussed above, the product information associated with the product identified by the product identifier may include real time pricing information for that product, real time inventory information for that product, real time location information for that product, and/or any other product information that has been collected and/or updated for that product and stored in the merchant physical location database 506.

Thus, at block 406 the system provider device 502 may use the product identifier to identify one of the products in the product data 506b in the merchant physical location database 506, and then retrieve any or all of the product information associated with that product including, but not limited to, pricing information, inventory information, and location information. In addition the system provider device 502 may also retrieve the merchant physical location information 506a from the merchant physical location database 506, as well as customer information about the customer 500 (e.g., using a customer identifier provided by the customer device 700) from the customer database 508.

Figure 7B:
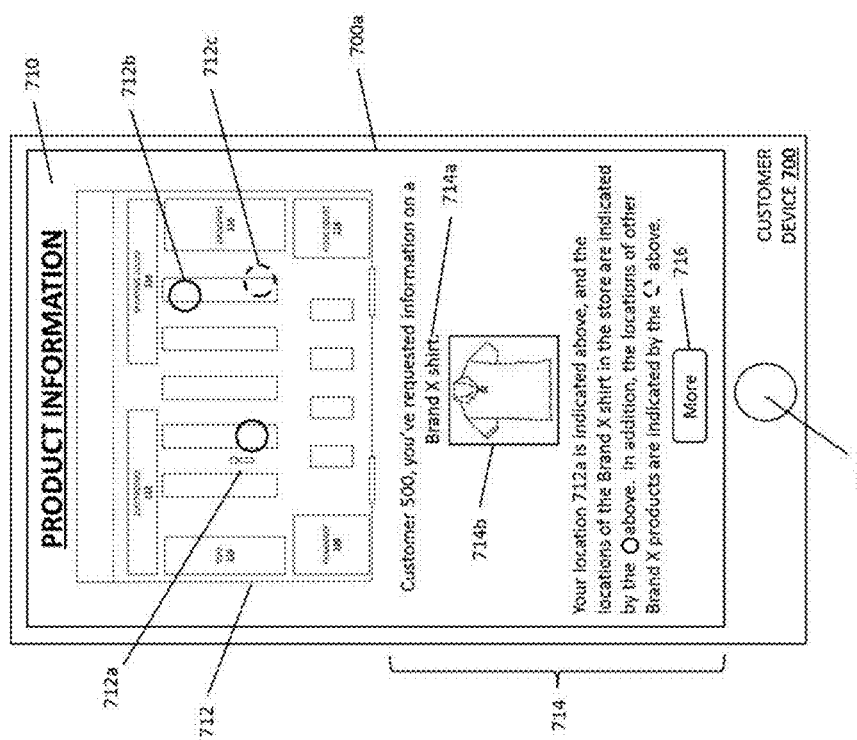
FIG. 7b is a front view illustrating an embodiment of a customer device displaying a product information screen.

Referring now to FIGS. 4, 5, 7b, 7c, and 7d, the method 400 then proceeds to block 408 where product information for a product is provided for display on a customer device. In an embodiment, the system provider device 502 provides the product information retrieved at block 406 through the beacon devices 504 to the customer device 700. In the embodiments discussed below, a few examples of product information screens are provided to illustrate how product information may be displayed to a customer. However, any manner of providing the product information retrieved at block 406 is envisioned as falling within the scope of the present disclosure. Referring first to FIG. 7b, the customer device 700 is illustrated displaying a product information screen 710 that may be displayed by the product information application on the customer device 700 following the provision of the product identifier using the product request screen 702 illustrated in FIG. 7a. The product information screen 710 includes a merchant physical location map 712 and a product location information section 714 that provide information on the location or locations of the product requested by the customer 500, and/or other products that may be of interest to the customer 500.

In the illustrated embodiment, the system provider device 502 has retrieved product information that includes the brand and type of the product requested by the customer 500, an image of the product requested by the customer 500, and locations of the product requested by the customer 500 in the merchant physical location 100. In addition, the system provider device 504 has also retrieved other product information that includes the location of other products provided by the same brand that provides the product requested by the customer 500, as well as a location of the customer (which may be estimated, for example, by determining the location of the customer device 700 via its communication with the beacon devices 504). As can be seen, the product location information section 714 displays product information 714a about the product that describes its brand and type ("Brand X shirt") and includes an image 714b of the product. The product location information section 714 and merchant physical location map 712 also include an indicator 712a of the detected location of the customer device 700 that is displayed on the merchant physical location map 712 and provides the location of the customer relative to the merchant physical location 100, as well as locations 712b and 712c in the merchant physical location 100 where the product is located and that are displayed on the merchant physical location map 712, and along with the location 712d in the merchant physical location 100 of other products that are provided by the same brand that provides the product requested by the customer 500 and that may be of interest to the customer 500. The product information screen 710 also includes a More Information button 716 that may be selected by the customer to access more product information about the product.

Thus, a customer 500 may enter the merchant physical location 100 and provide a product identifier for a product to receive real time location information associated with that product that describes the location(s) in the merchant physical location 100 where that product can be found, as well as the current location of the customer 500. Using merchant physical location information that describes the layout of merchant physical location 100, a map may be provided that allows the customer 500 to quickly and easily find the product that the customer 500 is searching for in the merchant physical location 100, or quickly and easily find other products that may be of interest in the merchant physical location 100. In embodiments where the product includes a beacon communication device that is configured to report the location of the product within the merchant physical location 100, the customer 500 may even be able to find a desired product that has been moved to a location around the merchant physical location 100 that that product is not normally located at (and thus that is unknown to the merchant). In situations where the location information for a product indicates that the product is located in the merchant physical location inventory section 104b, the customer 500 may request that the merchant retrieve their desired product from the merchant physical location inventory section 104b. While the product information screen 710 has been described as providing other product information that includes the locations of products offered by the same brand that provides the product requested by the customer 500, the locations of, for example, similar type products (e.g., similar shirts) or associated products (e.g., ties) may be indicated on the merchant physical location map 712 while remaining within the scope of the present disclosure.

Figure 7C:
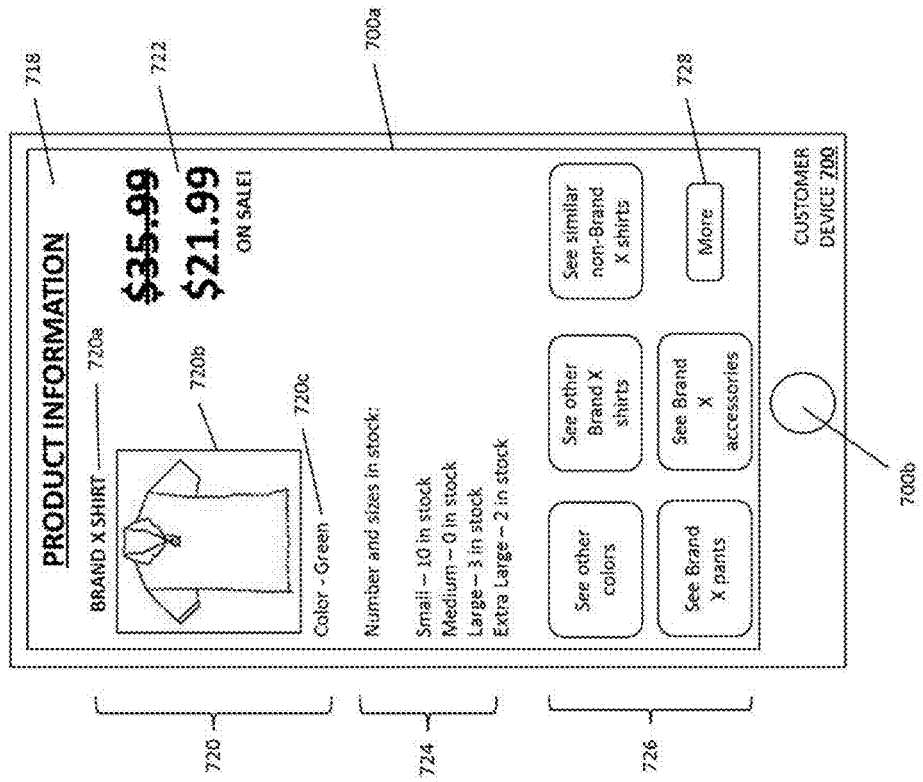
FIG. 7c is a front view illustrating an embodiment of a customer device displaying a product information screen.

Referring now to FIG. 7c, the customer device 700 is illustrated displaying a product information screen 718 that may be displayed by the product information application on the customer device 700 following the selection of the More Information button 716 on the product information screen 710 illustrated in FIG. 7b. The product information screen 718 includes a product information section 720, a pricing information section 722, an inventory information section 724, and another information section 726.

In the illustrated embodiment, the system provider device 502 has retrieved product information that includes the brand and type of the product requested by the customer 500, an image of the product requested by the customer 500, and a color of the product requested by the customer 500. In addition, the system provider device 504 has also retrieved pricing information for the product requested by the customer 500. Furthermore, the system provider device 504 has also retrieved inventory information at the merchant physical location 100 for the product requested by the customer 500 at the merchant physical location 100. As can be seen, the product information section 720 displays product information 720a about the product that describes its brand and type ("Brand X shirt"), an image 720b of the product, and a color 720c of the product. The pricing information section 722 displays pricing information that includes a previous price that is struck through (e.g., to indicate that the product is on sale), as well as a current price and an indication that the current price is a sale price relative to the previous price. The inventory information section 724 displays the inventory information at the merchant physical location 100 for the product, and in the illustrated embodiment indicates that there are 10 of the products in the green color available in a small size, 0 of the products in the green color available in a medium size, 3 of the products in the green color available in a large size, and 2 of the products in the green color available in an extra-large size. The other information section 726 includes buttons that may be selected by the customer to retrieve information about other colors of the product, other shirts by the same brand, similar shirts by different brands, pants by the same brand, and accessories by the same brand. The product information screen 718 also includes a More Information button 728 that may be selected by the customer to access more product information about the product.

Thus, a customer 500 may enter the merchant physical location 100 and provide a product identifier for a product to receive pricing information and inventory information associated with that product that describes the product the user is considering purchasing, the current price of that product, and availability (i.e., inventory details) of the product at the merchant physical location 100. In addition, information about similar or related products that may be of interest to the customer 500 may be retrieved by the customer 500 so that the customer can view similar descriptive product information, pricing information, and inventory information about those similar or related products. In addition, location information similar to that described above with reference to FIG. 7b may be retrieved for those similar or related products to determine their locations in the merchant physical location 100. While the product information screen 718 has been described as providing specific types of related or similar product information buttons (other colors of the product, other shirts by the same brand, similar shirts by different brands, pants by the same brand, and accessories by the same brand), other information may be available such as different sizes of the product, other products from the band, and/or a variety of other similar or related product information known in the art.

Figure 7D:
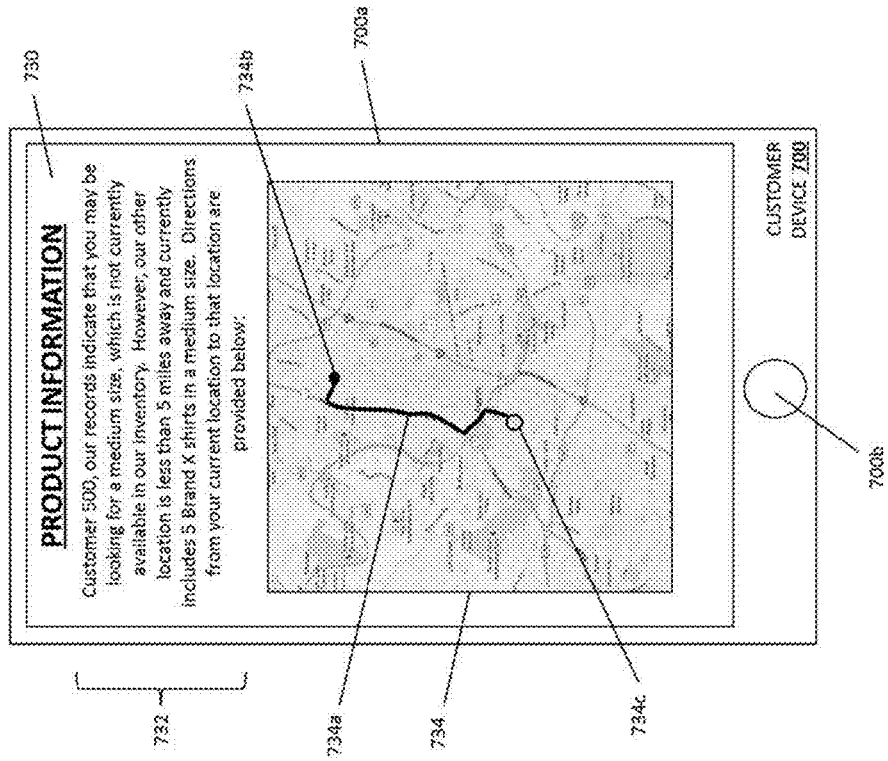
FIG. 7d is a front view illustrating an embodiment of a customer device displaying a product information screen.

Referring now to FIG. 7d, the customer device 700 is illustrated displaying a product information screen 730 that may be displayed by the product information application on the customer device 700 following the selection of the More Information button 728 on the product information screen 718 illustrated in FIG. 7b. The product information screen 730 includes a product information section 732 and a product location map 734.

In the illustrated embodiment, the system provider device 502 has retrieved customer information that indicates a product size of the customer, inventory information at the merchant physical location 100 about the product that indicates which sizes of product are available, product merchant physical location information that indicates that the product is available at a secondary merchant physical location, and location information for the secondary merchant physical location. As can be seen, the product information section 732 indicates to the customer 500 that records (e.g., a purchase history, customer preferences, etc.) indicate that they typically purchase medium sized shirts and that there are no medium sizes of the shirt that was requested by the customer 500 available at the merchant physical location 100, but that that shirt is available in medium sizes at a secondary merchant physical location that is less than 5 miles away. Furthermore, the product location map 734 provides directions 734a from the merchant physical location (indicated by the circle 734b on the product location map 734) to the secondary merchant physical location (indicated by the dot 734c on the product location map 734).

Thus, a customer 500 may enter the merchant physical location 100 and provide a product identifier for a product and, if inventory information associated with that product indicates that the product is not available at the merchant physical location, the customer 500 may be provided with a secondary merchant physical location at which the product is available, along with directions to that secondary merchant physical location. While the product information screen 718 has been described as providing a secondary merchant physical location that is related to the merchant physical location 100 and that provide a product that is not available at a first merchant physical location 100, merchant physical locations that are not related to the merchant physical location 100 may be provided that have the product available if it is determined that the product is unavailable at a merchant physical location 100.

As discussed above, while a few examples of the provision of product information have been provided, any product information associated with products may be provided in any configuration or order while remaining within the scope of the present disclosure. Thus, while the product and other information has been illustrated as being used to provide the location of the product in the merchant physical location 100, followed by the pricing information and inventory information for the product at the merchant physical location 100, and then followed by the location information for the product at a secondary merchant physical location, any presentation and/or ordering of the product information and other information discussed above is envisioned as falling within the scope of the present disclosure. Furthermore, the customer or merchant may be able to configure the presentation and/or ordering of presentation of the product information by the product information application in order to provide the product information they would like to view or present in the order they would like view or present it.

Thus, systems and methods for providing product information has been described that provide customers at a merchant physical location access to real time pricing information, inventory information, location information, and/or other information for any of a plurality of products provided at the merchant physical location. The product information and other information may be utilized by the customer to quickly determine the location(s) where that product can be found in the merchant physical location, the location(s) where similar or related products can be found at the merchant physical location, the inventory status of a desired product at the merchant physical location, the pricing status of the a desired product at the merchant physical location, other merchant physical locations where the product may be available, and/or a variety of other product information known in the art. Such systems and methods provide improvements over conventional systems that limit a customer to attempting to obtain such information from merchant employees who typically do not have easy and quick access to such information. While the systems and methods discussed above have been described as being used by customers of a merchant at a merchant physical location, one of skill in the art in possession of the present disclosure will recognize that the systems and methods discussed herein may be used by employees of the merchant to provide similar benefits to those discussed above that are provided to the customers.

Figure 8:
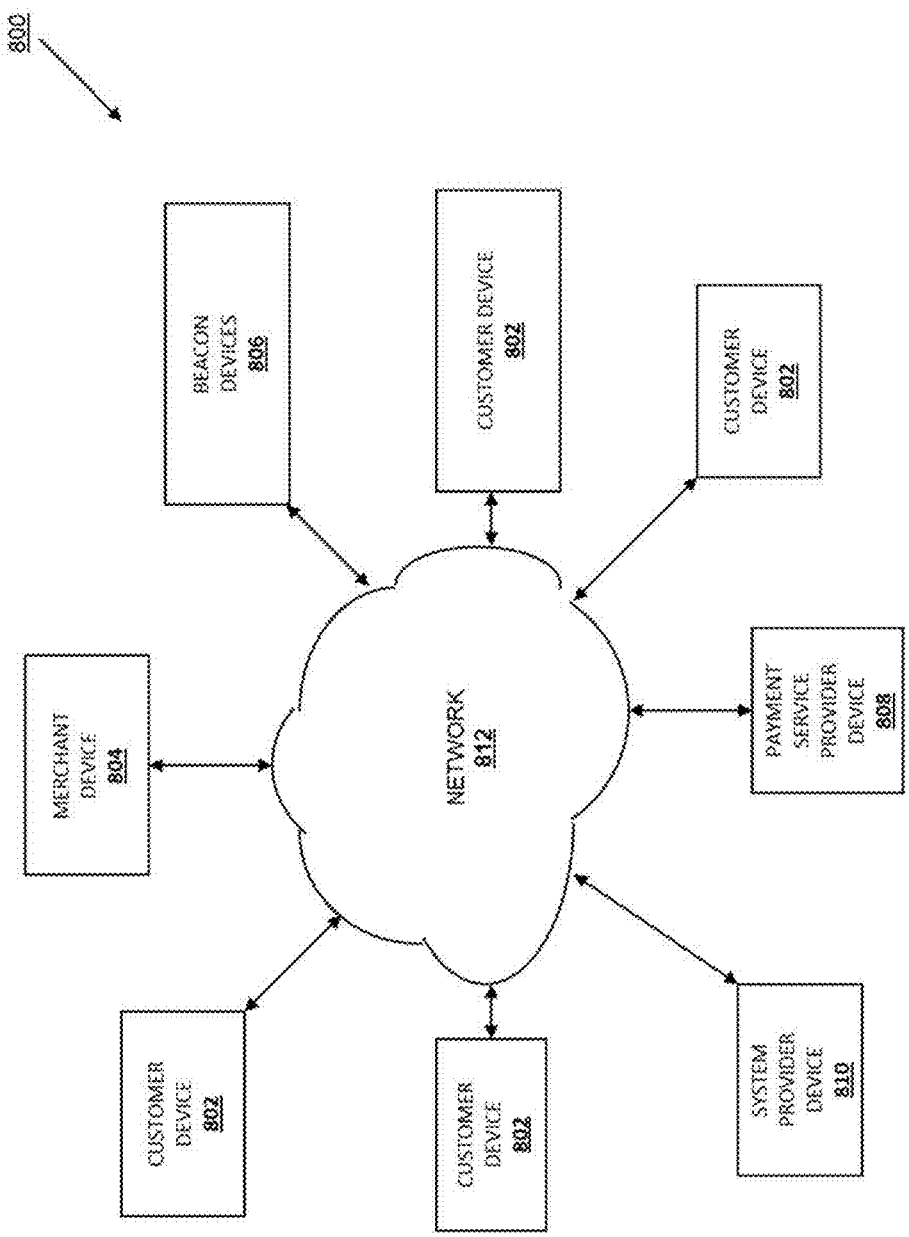
FIG. 8 is a schematic view illustrating an embodiment of a networked system.

Referring now to FIG. 8, an embodiment of a network-based system 800 for implementing one or more processes described herein is illustrated. As shown, the network-based system 800 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes a plurality of customer devices 802, a merchant device 804, a plurality of beacon devices 806, a payment service provider device 808, and/or a system provider device 810 in communication over one or more networks 812. The customer devices 802 may be the customer devices discussed above and may be operated by the customers discussed above. The merchant devices 804 and beacon devices 806 may be the merchant devices and beacon devices discussed above and may be operated by the merchants discussed above. The payment service provider device 808 may be the payment service provider devices discussed above and may be operated by a payment service provider such as, for example, PayPal Inc. of San Jose, Calif. The system provider devices 810 may be the system provider devices discussed above and may be operated by the system providers discussed above.

The customer devices 802, merchant device 804, beacon devices 806, payment service provider device 808, and/or system provider device 810 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 812.

The network 812 may be implemented as a single network or a combination of multiple networks. For example, in various embodiments, the network 812 may include the Internet and/or one or more intranets, landline networks, wireless networks, and/or other appropriate types of networks.

The customer devices 802 may be implemented using any appropriate combination of hardware and/or software configured for wired and/or wireless communication over network 812. For example, in one embodiment, the customer devices 802 may be implemented as a personal computer of a user in communication with the Internet. In other embodiments, the customer devices 802 may be a smart phone, personal digital assistant (PDA), laptop computer, and/or other types of computing devices.

The customer devices 802 may include one or more browser applications which may be used, for example, to provide a convenient interface to permit the customer to browse information available over the network 812. For example, in one embodiment, the browser application may be implemented as a web browser configured to view information available over the Internet.

The customer devices 802 may also include one or more toolbar applications which may be used, for example, to provide user-side processing for performing desired tasks in response to operations selected by the customer. In one embodiment, the toolbar application may display a user interface in connection with the browser application.

The customer devices 802 may further include other applications as may be desired in particular embodiments to provide desired features to the customer devices 802. In particular, the other applications may include a payment application for payments assisted by a payment service provider through the payment service provider device 808. The other applications may also include security applications for implementing user-side security features, programmatic user applications for interfacing with appropriate application programming interfaces (APIs) over the network 812, or other types of applications. Email and/or text applications may also be included, which allow customer payer to send and receive emails and/or text messages through the network 812. The customer devices 802 includes one or more user and/or device identifiers which may be implemented, for example, as operating system registry entries, cookies associated with the browser application, identifiers associated with hardware of the customer devices 802, or other appropriate identifiers, such as a phone number. In one embodiment, the user identifier may be used by the payment service provider device 808 to associate the user with a particular account as further described herein.

The merchant device 804 may be maintained, for example, by a conventional or on-line merchant, conventional or digital goods seller, individual seller, and/or application developer offering various products and/or services in exchange for payment to be received conventionally or over the network 812. In this regard, the merchant device 804 may include a database identifying available products and/or services (e.g., collectively referred to as items) which may be made available for viewing and purchase by the customer.

The merchant device 804 also includes a checkout application which may be configured to facilitate the purchase by the payer of items. The checkout application may be configured to accept payment information from the user through the customer devices 802 and/or from the payment service provider through the payment service provider device 808 over the network 812.

Figure 9:
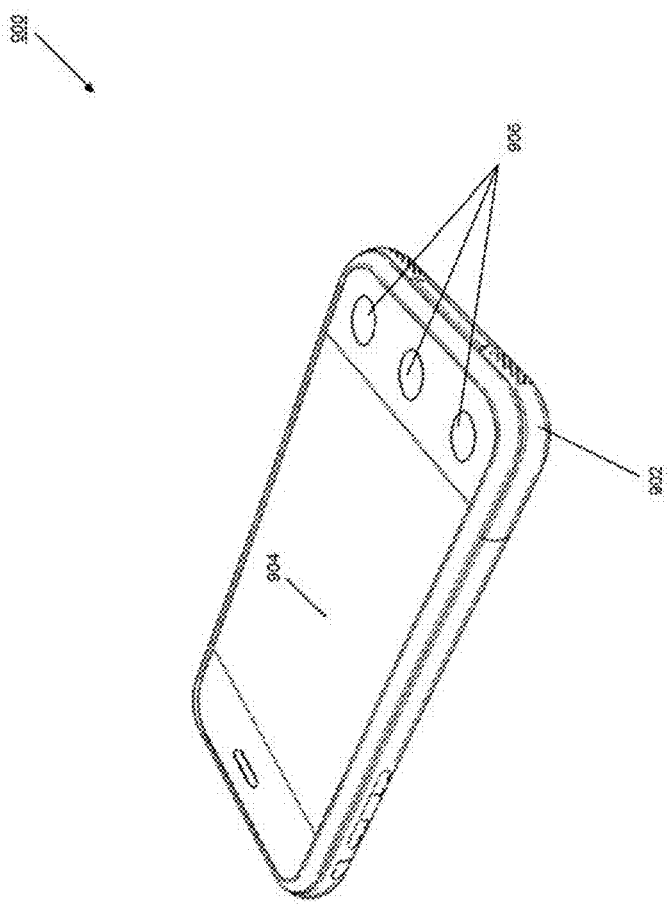
FIG. 9 is a perspective view illustrating an embodiment of a customer device.

Referring now to FIG. 9, an embodiment of a customer device 900 is illustrated. The customer device 900 may be the customer devices 700 or 802 discussed above. The customer device 900 includes a chassis 902 having a display 904 and an input device including the display 904 and a plurality of input buttons 906. One of skill in the art will recognize that the customer device 900 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 10:
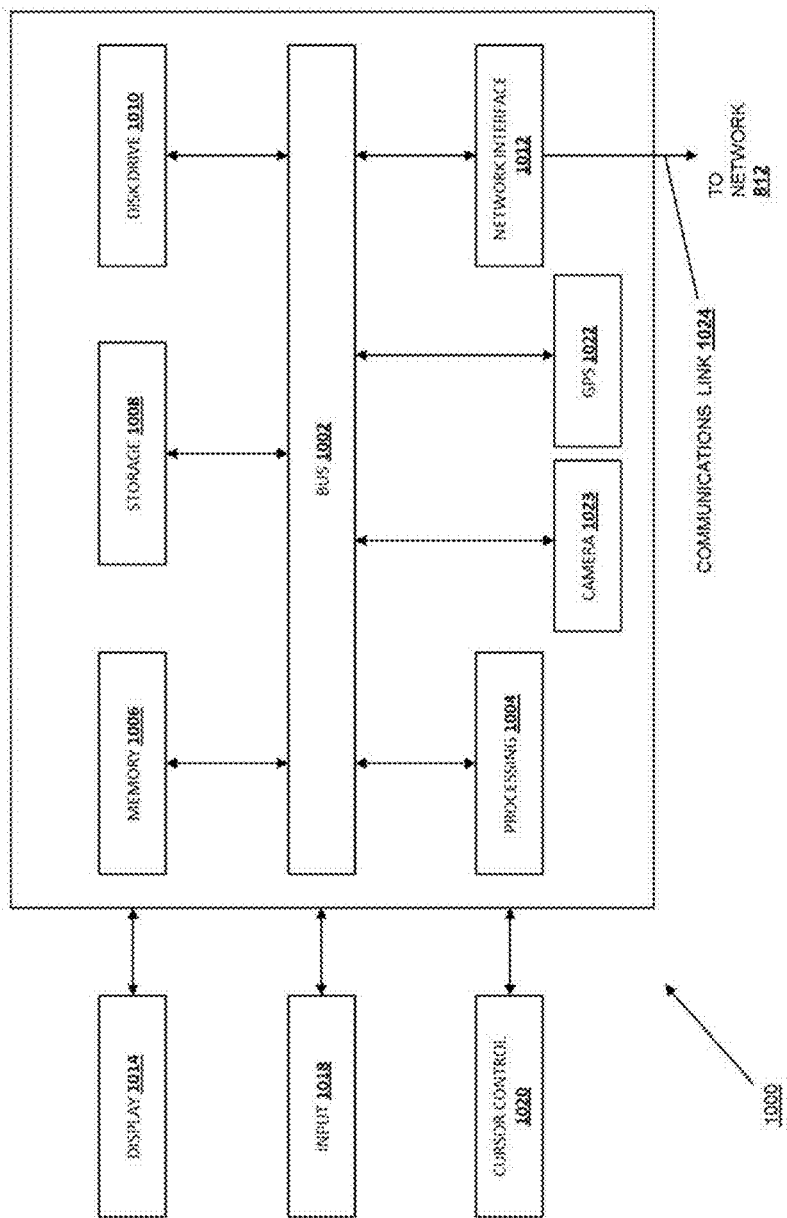
FIG. 10 is a schematic view illustrating an embodiment of a computer system.

Referring now to FIG. 10, an embodiment of a computer system 1000 suitable for implementing, for example, the customer devices 700 or 802, merchant device 804, beacon devices 200, 504, or 806, payment service provider device 808, and/or system provider devices 502 or 810, is illustrated. It should be appreciated that other devices utilized by customers, merchants, beacon devices, merchant beacon communication devices, payment service providers, and/or system providers in the system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the customer devices 802, merchant device 804, beacon devices 806, payment service provider device 808, and/or system provider device 810. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 812 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
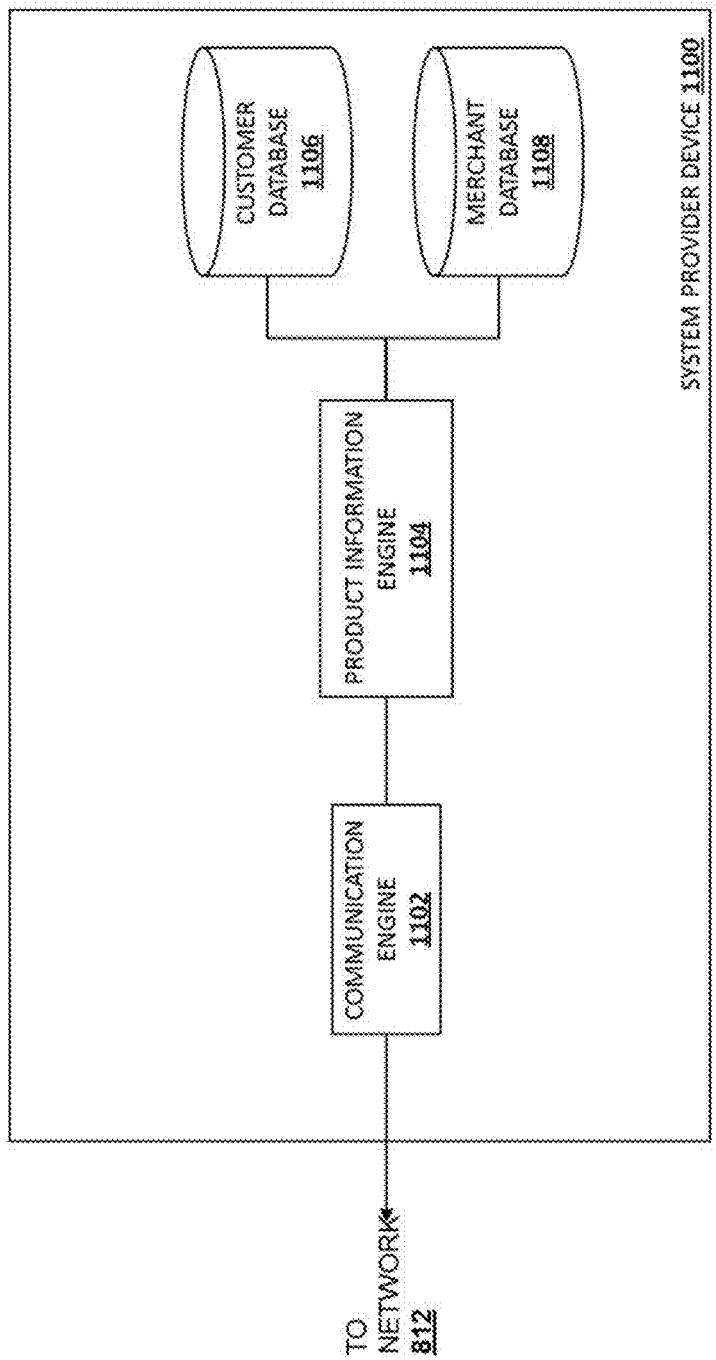
FIG. 11 is a schematic view illustrating an embodiment of a system provider device.

Referring now to FIGS. 11, an embodiment of a system provider device 1100 is illustrated. In an embodiment, the device 1100 may be the system provider devices discussed above. The device 1100 includes a communication engine 1102 that is coupled to the network 812 and to a product information engine 1104 that is coupled to a customer information database 1106 and a merchant information database 1108. The communication engine 1102 may be software or instructions stored on a computer-readable medium that allows the device 1100 to send and receive information over the network 812. The product information engine 1104 may be software or instructions stored on a computer-readable medium that is operable to update product information at the merchant physical location, receive product identifiers, determine product identifiers, retrieve product information using a product identifier, provide product information for display on a customer device, as well as provide any of the other functionality that is discussed above. While the databases 1106 and 1108 have been illustrated as located in the device 1100, one of skill in the art will recognize that it may be connected to the product information engine 1104 through the network 812 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A merchant physical location product information system, comprising:
  a wireless merchant communication subsystem;
  at least one non-transitory memory storing:
    a graphical first merchant physical location map for a first merchant physical location; and
    a product information database that includes:
      respective product identifiers for each of a plurality of products at the first merchant physical location that each include a respective wireless product communication device, wherein each of the respective product identifiers for each of the plurality of product is associated in the database with each of:
        product pricing information for that product;
        product location information for that product; and
        product inventory information for that product; and
  one or more hardware processors that are coupled to the wireless merchant communication subsystem and the at least one non-transitory memory, wherein the one or more hardware processors are configured to execute instructions to cause the system to perform operations comprising:
    monitoring for updated product information;
    identifying, in response to the monitoring for the updated product information, updated product pricing information for each of the plurality of products;
    updating, in association with each respective product identifier in the at least one non-transitory memory and in response to identifying the updated product pricing information, the product pricing information for each of the plurality of products to provide real-time product pricing information for each of the plurality of products;
    receiving, through the wireless merchant communication subsystem from the respective wireless product communication devices, a product communication from each of the plurality of products;
    identifying, in response to the monitoring for updated product information and based on the receiving of the product communications, respective updated relative product location information for each of the plurality of products and respective updated product inventory information for each of the plurality of products;
    updating, in association with each respective product identifier in the at least one non-transitory memory and in response to identifying the respective updated relative product location information for each of the plurality of products and the respective updated product inventory information for each of the plurality of products, the product location information and the product inventory information for each of the plurality of products to provide real-time product location information and real-time product inventory information for each of the plurality of products;
    receiving, through a network from a first customer device, a first product identification communication;
    identifying, using the first product identification communication, a first product identifier;
    retrieving, from the at least one non-transitory memory using the first product identifier, first real-time product pricing information associated with the first product identifier, first real-time product inventory information associated with the first product identifier, and first real-time product location information associated with the first product identifier; and
    providing, for display on the first customer device, a first product information graphical user interface that includes:
      the first real-time product pricing information associated with the first product identifier;
      the graphical first merchant physical location map that indicates the first real-time product location information for at least one first product in the first merchant physical location that is associated with the first product identifier; and
      the first real-time product inventory information that is associated with the first product identifier, wherein the first real-time product inventory information indicates a number of the at least one first product available in the first merchant physical location in each of a plurality of product sizes.

2. The system of claim 1, wherein the first real-time product inventory information indicates a number of the first product available in the first merchant physical location.

3. The system of claim 1, wherein the receiving the product identifier communication and identifying the first product identifier includes at least one of:
receiving scanned code information and decoding the scanned code information to identify the first product identifier; or
the first product and performing image recognition on the image to identify the first product identifier receiving radio frequency identification (RFID) information.

4. The system of claim 1, wherein the first product inventory information indicates a color of the first product available in the first merchant physical location in each of the plurality of product sizes.

5. The system of claim 1, wherein the graphical first merchant physical location map includes the first real-time product location information for each of a plurality of first products in the first merchant physical location that are associated with the first product identifier by being associated with a same product brand.

6. The system of claim 1, wherein the operations further comprise:
receiving, through the network from a second customer device, a second product identification communication;
identifying, using the second product identification communication, a second product identifier;
retrieving, from the at least one non-transitory memory using the second product identifier, second real-time product inventory information associated with the second product identifier;
determining that the second real-time product inventory information indicates that a second product associated with the second product identifier is not available at the first merchant physical location and is available at a second merchant physical location that is different than the first merchant physical location; and
providing, for display on the first customer device, a second product information graphical user interface that includes:
a graphical navigation map to the second merchant physical location.

7. A method for providing product information at a merchant physical location, comprising:
monitoring, by a system provider device, for updated product information;
identifying, by the system provider device in response to the monitoring for the updated product information, updated product pricing information for each of a plurality of products that are located in a first merchant physical location;
updating, by the system provider device in response to identifying the updated product pricing information and in association with a respective product identifier provided for each of the plurality of products in a database, product pricing information provided in the database for each of the plurality of products in the first merchant physical location to provide real-time product pricing information for each of the plurality of products;
receiving, by the system provider device through a wireless merchant communication subsystem from a respective wireless product communication device included on each of the plurality of products, a product communication from each of the plurality of products;
identifying, by the system provider device in response to the monitoring for updated product information and based on the receiving of the product communications, respective updated relative product location information for each of the plurality of products and respective updated product inventory information for each of the plurality of products;
updating, by the system provider device and in association with each respective product identifier for each of the plurality of products in the database and in response to identifying the respective updated relative product location information for each of the plurality of products and the respective updated product inventory information for each of the plurality of products, product location information and the product inventory information provided in the database for each of the plurality of products to provide real-time product location information and real-time product inventory information for each of the plurality of products;
receiving, by the system provider device through a network from a first customer device, a first product identification communication;
identifying, by the system provider device using the first product identification communication, a first product identifier;
retrieving, by the system provider device from the database using the first product identifier, first real-time product pricing information associated with the first product identifier, first real-time product inventory information associated with the first product identifier, and first real-time product location information that was associated with the first product identifier; and
providing, by the system provider device for display on the first customer device, a first product information graphical user interface that includes:
the first real-time product pricing information associated with the first product identifier;
a graphical first merchant physical location map that indicates the first real-time product location information for each of a plurality of first products in the first merchant physical location that are associated with the first product identifier by being associated with a same product brand; and
the first real-time product inventory information that is associated with the first product identifier.

8. The method of claim 7,
wherein the first real-time product inventory information indicates a number of the first product available in the first merchant physical location.

9. The method of claim 7, wherein the receiving the product identifier communication and identifying the first product identifier includes at least one of:
receiving scanned code information and decoding the scanned code information to identify the first product identifier; or
receiving an image of the first product and performing image recognition on the image to identify the first product identifier.

10. The method of claim 7, wherein the first real-time product inventory information indicates a number of the first product available in the first merchant physical location in each of a plurality of product sizes.

11. The method of claim 7, wherein the first real-time product inventory information indicates a number of the first product available in the first merchant physical location in each of a plurality of colors.

12. The method of claim 7, wherein the first real-time product pricing information associated with the first product identifier indicates a reduction in a price of a first product associated with the first product identifier.

13. The method of claim 7, further comprising:
receiving, by the system provider device through the network from a second customer device, a second product identification communication;
identifying, by the system provider device using the second product identification communication, a second product identifier;
retrieving, by the system provider device from the at least one non-transitory memory using the second product identifier, second real-time product inventory information associated with the first product identifier;
determining, by the system provider device, that the second real-time product inventory information indicates that a second product associated with the second product identifier is not available at the first merchant physical location and is available at a second merchant physical location that is different than the first merchant physical location; and
providing, by the system provider device for display on the first customer device, a second product information graphical user interface that includes:
a graphical navigation map to the second merchant physical location.

14. A non-transitory machine-readable medium having stored thereon machine-readable instructions executable to cause a machine to perform operations comprising:
monitoring for updated product information;
identifying, in response to the monitoring for the updated product information, updated product pricing information for each of a plurality of products that are located in a first merchant physical location;
updating, in response to identifying the updated product pricing information and in association with a respective product identifier provided for each of the plurality of products in a database, product pricing information provided in the database for each of the plurality of products in the first merchant physical location to provide real-time product pricing information for each of the plurality of products;
receiving, through a wireless merchant communication subsystem from a respective wireless product communication device included on each of the plurality of products, a product communication from each of the plurality of products;
identifying, in response to the monitoring for updated product information and based on the receiving of the product communications, respective updated relative product location information for each of the plurality of products and respective updated product inventory information for each of the plurality of products;
updating, in association with each respective product identifier for each of the plurality of products in the database and in response to identifying the respective updated relative product location information for each of the plurality of products and the respective updated product inventory information for each of the plurality of products, product location information and the product inventory information provided in the database for each of the plurality of products to provide real-time product location information and real-time product inventory information for each of the plurality of products;

receiving, through a network from a first customer device, a first product identification communication;
identifying, using the first product communication, a first product identifier;
retrieving, from the database using the first product identifier, first real-time product pricing information associated with the first product identifier, first real-time product inventory information associated with the first product identifier, and first real-time product location information that was associated with the first product identifier; and
providing, for display on the first customer device, a first product information graphical user interface that includes:
the first real-time product pricing information associated with the first product identifier;
a graphical first merchant physical location map that indicates the first real-time location information for at least one first product in the first merchant physical location that is associated with the first product identifier; and
the first real-time product inventory information that is associated with the first product identifier, wherein the first real-time product inventory information indicates a number of the at least one first product available in the first merchant physical location in each of a plurality of product sizes.

15. The non-transitory machine-readable medium of claim 14, wherein the first real-time product inventory information indicates a number of the first product available in the first merchant physical location.

16. The non-transitory machine-readable medium of claim 14, wherein the receiving the product identification communication and identifying the first product identifier includes at least one of:
receiving scanned code information and decoding the scanned code information to identify the first product identifier; or
receiving an image of the first product and performing image recognition on the image to identify the first product identifier.

17. The non-transitory machine-readable medium of claim 14, wherein the first real-time product pricing information associated with the first product identifier indicates a reduction in a price of a first product associated with the first product identifier.

18. The non-transitory machine-readable medium of claim 14, wherein the first real-time product inventory information indicates a number of the first product available in the first merchant physical location in each of a plurality of colors.

19. The non-transitory machine-readable medium of claim 14, wherein the graphical first merchant physical location map includes the first real-time product location information for each of a plurality of first products in the first merchant physical location that are associated with the first product identifier by being associated with a same product brand.

20. The non-transitory machine-readable medium of claim 14, wherein the operations further comprise:
receiving, through the network from a second customer device, a second product identification communication;
identifying, using the second product identification communication, a second product identifier;
retrieving, from the database using the second product identifier, second real-time product inventory information associated with the first product identifier;

determining that the second real-time product inventory information indicates that a second product associated with the second product identifier is not available at the first merchant physical location and is available at a second merchant physical location that is different than the first merchant physical location; and providing, for display on the first customer device, a second product information graphical user interface that includes:

a graphical navigation map to the second merchant physical location.

* * * * *